United States Patent
Peng et al.

(10) Patent No.: US 10,724,671 B2
(45) Date of Patent: Jul. 28, 2020

(54) QUICK RELEASE CONNECTION STRUCTURES, SUPPORT STRUCTURES, AND REMOTE CONTROLLERS

(71) Applicant: SZ DJI TECHNOLOGY CO., LTD., Shenzhen (CN)

(72) Inventors: Tao Peng, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/637,589

(22) Filed: Jun. 29, 2017

(65) Prior Publication Data
US 2017/0299110 A1     Oct. 19, 2017

Related U.S. Application Data

(63) Continuation of application No. PCT/CN2014/095596, filed on Dec. 30, 2014.

(51) Int. Cl.
| | |
|---|---|
| *F16M 11/04* | (2006.01) |
| *F16B 7/20* | (2006.01) |
| *G08C 17/00* | (2006.01) |
| *F16M 11/16* | (2006.01) |
| *F16M 13/02* | (2006.01) |

(52) U.S. Cl.
CPC .............. *F16M 11/04* (2013.01); *F16B 7/20* (2013.01); *F16M 11/16* (2013.01); *F16M 13/02* (2013.01); *G08C 17/00* (2013.01); *F16M 11/041* (2013.01)

(58) Field of Classification Search
CPC ........ F16M 11/04; F16M 11/16; F16M 13/02; F16M 11/041; F16B 7/20; G08C 17/00; Y10T 403/7005
See application file for complete search history.

(56) References Cited

U.S. PATENT DOCUMENTS

| | | | |
|---|---|---|---|
| 9,122 A | * | 7/1852 | Sergeant .................. A47C 3/18 5/302 |
| 4,842,231 A | | 6/1989 | Warshawsky |
| 6,467,989 B1 | | 10/2002 | Finkelstein |
| 6,880,791 B1 | | 4/2005 | Lin |
| 7,930,859 B1 | | 4/2011 | Eslambolchi et al. |

(Continued)

FOREIGN PATENT DOCUMENTS

| | | |
|---|---|---|
| CN | 2785097 Y | 5/2006 |
| CN | 201250989 Y | 6/2009 |

(Continued)

OTHER PUBLICATIONS

The World Intellectual Property Organization (WIPO) International Search Report for PCT/CN2014/095596 dated Oct. 12, 2015 8 Pages.

*Primary Examiner* — Kimberly T Wood
(74) *Attorney, Agent, or Firm* — Anova Law Group, PLLC (57) ABSTRACT

A remote controller includes a handheld device and a support structure detachably coupled to the handheld device. The handheld device includes a quick release base. The support structure includes a clamping mechanism, a connecting shaft coupled to the clamping mechanism, and a locking member sleeved on the connecting shaft and rotatable around the connecting shaft. The locking member is configured to be rotatably switched between a locked state of being engaged with the quick release base and an unlocked state of being separated from the quick release base.

11 Claims, 8 Drawing Sheets

(56) References Cited

U.S. PATENT DOCUMENTS

| | | | | |
|---|---|---|---|---|
| 2005/0262987 | A1* | 12/2005 | Chen | G10H 3/146 84/453 |
| 2008/0199252 | A1* | 8/2008 | Frey | G02B 23/2476 403/325 |
| 2011/0110716 | A1* | 5/2011 | Slater | A61F 2/4684 403/348 |
| 2011/0113558 | A1* | 5/2011 | Olszewski | A61G 13/101 5/658 |
| 2012/0042484 | A1* | 2/2012 | Hsu Huang | H04R 1/02 24/457 |

FOREIGN PATENT DOCUMENTS

| | | |
|---|---|---|
| CN | 201513679 U | 6/2010 |
| CN | 202237273 U | 5/2012 |
| CN | 203315750 U | 12/2013 |
| CN | 203630502 U | 6/2014 |
| CN | 203847941 U | 9/2014 |
| JP | 3064361 U | 1/2000 |
| JP | 2014043906 A | 3/2014 |

* cited by examiner

QUICK RELEASE CONNECTION STRUCTURES, SUPPORT STRUCTURES, AND REMOTE CONTROLLERS

CROSS-REFERENCE TO RELATED APPLICATION

This is a continuation application of International Application No. PCT/CN2014/095596, filed on Dec. 30, 2014, the entire contents of which are incorporated herein by reference.

TECHNICAL FIELD

The present disclosure relates to connection structures, and in particular, to quick release connection structures, support structures using the quick release connection structures, and remote controllers.

BACKGROUND

In a conventional remote controller, a support structure of a portable electronic device, such as a mobile phone or a tablet computer, is often fixed onto a remote controller body. This makes the support structure either not detachable or detachable only through a relatively complicated detaching manner. However, for a handheld remote controller, a user generally hopes that the support structure can be quickly released when not in use, allowing for easy to carry and use.

SUMMARY

In one aspect of the present disclosure, a quick release connection structure is provided. The connection structure may include: a connecting shaft, a locking member sleeved on the connecting shaft and rotatable around the connecting shaft, and a quick release base detachably connected to the locking member. The locking member may be rotatably selected to be in a locked state of being engaged with the quick release base and an unlocked state of being separated from the quick release base.

In some embodiments, the support structure detachably engages with the quick release base through the connecting shaft of the quick release connection structure and detachably mounts a clamping mechanism onto a handheld device, such as a remote controller body. This allows the support structure to be more conveniently mounted on the handheld device, such as the remote controller body, or to be removed from the handheld device, such as the remote controller body.

In some embodiments, the quick release base includes a positioning hole for insertion of the connecting shaft.

In some embodiments, the locking member engages with the quick release base by thread.

In some embodiments, the locking member includes external threads, and the positioning hole is a threaded hole that may engage with the external threads by screw.

In some embodiments, the locking member includes a threaded hole, the positioning hole internally includes a limiting barrel, the connecting shaft passes through the limiting barrel, and an outer wall of the limiting barrel includes external threads that may engage with the threaded hole of the locking member by screw.

In some embodiments, the locking member includes a lock catch, and the quick release base includes a slot that engages with the lock catch.

In some embodiments, the lock catch is disposed on an outer surface of the locking member, and the slot is disposed on an interior wall of the positioning hole.

In some embodiments, the lock catch is disposed on an inner surface of the locking member, the positioning hole internally includes a limiting barrel, the connecting shaft passes through the limiting barrel, and the slot is disposed on an outer wall of the limiting barrel.

In some embodiments, the slot includes a guiding slot portion and a locking notch in communication with the guiding slot portion, and the lock catch slides into the guiding slot portion from the locking notch such that it engages with the guiding slot portion.

In some embodiments, the locking member is predisposed to automatically reset to its original position after rotating around the connecting shaft.

In some embodiments, a rotating reset member that provides a rotational torque for the locking member is further included.

In some embodiments, the rotating reset member is sleeved on the connecting shaft, and is connected to the locking member.

In some embodiments, the locking member includes a limiting part for limiting a rotation angle of the locking member relative to the connecting shaft.

In some embodiments, the locking member is predisposed to automatically remain at its current rotation position after rotating around the connecting shaft.

In some embodiments, a limiting mechanism for limiting the locking member is further included.

In some embodiments, a connecting member detachably connected to one end of the connecting shaft, which is away from the quick release base, is further included. The connecting shaft includes a blocking portion, and two ends of the locking member abut against the connecting member and the blocking portion respectively.

In some embodiments, a limiting pin is further included, the connecting member includes a shaft hole and a limiting hole in communication with the shaft hole, the connecting shaft is inserted into the shaft hole, and the limiting pin is inserted into the limiting hole and abuts against the connecting shaft.

In some embodiments, one end of the connecting shaft that engages with the quick release base includes a guiding portion, and the shape of the guiding portion matches the shape of the bottom of the positioning hole.

A remote controller, including: the quick release connection structure described above; a clamping mechanism connected to the connecting shaft; and a remote controller body fixedly connected to the quick release base. The clamping mechanism is detachably connected to the remote controller body through the quick release connection structure.

A support structure for fixing a portable electronic device onto a handheld device, the handheld device including a quick release base, the support structure including: a clamping mechanism; a connecting shaft connected to the clamping mechanism; and a locking member sleeved on the connecting shaft and rotatable around the connecting shaft. The locking member is rotatably selected to be in a locked state of being engaged with the quick release base and an unlocked state of being separated from the quick release base.

In some embodiments, the quick release base includes a positioning hole for insertion of the connecting shaft.

In some embodiments, the locking member engages with the quick release base by thread.

In some embodiments, the locking member includes external threads, and the positioning hole is a threaded hole that engages with the external threads by screw.

In some embodiments, the locking member includes a threaded hole, the positioning hole internally includes a limiting barrel, the connecting shaft passes through the limiting barrel, and an outer wall of the limiting barrel includes external threads that engage with the threaded hole of the locking member by screw.

In some embodiments, the locking member includes a lock catch, and the quick release base includes a slot that engages with the lock catch.

In some embodiments, the lock catch is disposed on an outer surface of the locking member, and the slot is disposed on an interior wall of the positioning hole.

In some embodiments, the lock catch is disposed on an inner surface of the locking member, the positioning hole internally includes a limiting barrel, the connecting shaft passes through the limiting barrel, and the slot is disposed on an outer wall of the limiting barrel.

In some embodiments, the slot includes a guiding slot portion and a locking notch in communication with the guiding slot portion, and the lock catch slides into the guiding slot portion from the locking notch such that it engages with the guiding slot portion.

In some embodiments, the locking member is predisposed to automatically reset to its original position after rotating around the connecting shaft.

In some embodiments, a rotating reset member that provides a rotational torque for the locking member is further included.

In some embodiments, the rotating reset member is sleeved on the connecting shaft, and is connected to the locking member.

In some embodiments, the locking member includes a limiting part for limiting a rotation angle of the locking member relative to the connecting shaft.

In some embodiments, the locking member is predisposed to automatically remain at its current rotation position after rotating around the connecting shaft.

In some embodiments, a limiting mechanism for limiting the locking member is further included.

In some embodiments, a connecting member detachably connected to one end of the connecting shaft, which is away from the quick release base, is further included. The connecting shaft includes a blocking portion, and two ends of the locking member abut against the connecting member and the blocking portion respectively.

In some embodiments, a limiting pin is further included, the connecting member includes a shaft hole and a limiting hole in communication with the shaft hole, the connecting shaft is inserted into the shaft hole, and the limiting pin is inserted into the limiting hole and abuts against the connecting shaft.

In some embodiments, one end of the connecting shaft that engages with the quick release base includes a guiding portion, and the shape of the guiding portion matches the shape of the bottom of the positioning hole.

A remote controller, including the support structure described above.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION OF THE EMBODIMENTS

Technical solutions of the present disclosure will be described with reference to the drawings. It will be appreciated that embodiments as described in the disclosure are a part rather than all of the embodiments of the present disclosure. Other embodiments, which are conceived by those having ordinary skills in the art on the basis of the disclosed embodiments without inventive efforts, should fall within the scope of the present disclosure.

As used herein, when a first assembly is referred to as "fixed to" a second assembly, it is intended that the first assembly may be directly attached to the second assembly or may be indirectly attached to the second assembly via another assembly. When a first assembly is referred to as "connecting to" a second assembly, it is intended that the first assembly may be directly connected to the second assembly or may be indirectly connected to the second assembly via another assembly. The terms "perpendicular," "horizontal," "left," "right," and similar expressions used herein are merely intended for description.

Unless otherwise defined, all the technical and scientific terms used herein have the same or similar meanings as generally understood by a person skilled in the technical field of the present disclosure. As described herein, the terms used in the specification of the present disclosure are intended to describe exemplary embodiments, instead of limiting the present disclosure. The term "and/or" used herein includes any suitable combination one or more related items listed.

In one aspect of the present disclosure, a quick release structure is provided. The quick release structure includes a connecting shaft, a locking member, and a quick release base. The locking member is rotatably connected to the connecting shaft to selectively operate the locking member in a locked state or an unlocked state. In the locked state, the locking member engages or fits with the quick release base.

In the unlocked state, the locking member is disengaged or separated from the quick release base.

In some embodiments, the locking member may engage or fit with the quick release base through threaded connection, lock-catch snap connection, or any other suitable manners.

In some embodiments, the locking member may automatically reset after rotating around the connecting shaft. Alternatively, the locking member may stay at a current rotation position after rotating around the connecting shaft.

Based on the quick release connection structure described above, in another aspect of the present disclosure, a support structure is provided. The support structure may fix a portable electronic device onto a handheld device, such as the body of a remote controller. The support structure includes a clamping mechanism, a connecting shaft connected to the clamping mechanism, and a locking member rotatably connected to the connecting shaft. The locking member is detachably connected to the quick release base on the handheld device, so as to detachably fix the support structure onto the handheld device.

Based on the quick release connection structure described above, in another aspect of the present disclosure, a remote controller is provided. The remote controller includes the quick release connection structure described above, a clamping mechanism, and a remote controller body. The clamping mechanism is fixed to the remote controller body through the quick release connection structure, and may clamp a portable electronic device or the like, such as a mobile phone, a tablet computer, etc.

Reference will now be made in detail to embodiments and aspects of the present disclosure, examples of which are illustrated in the accompanying drawings. Where possible, the same reference numbers will be used throughout the drawings to refer to the same or like parts. Those of ordinary skill in the art in view of the disclosure herein will recognize that features of one or more of the embodiments described in the present disclosure may be selectively combined or alternatively used.

Figure 1:
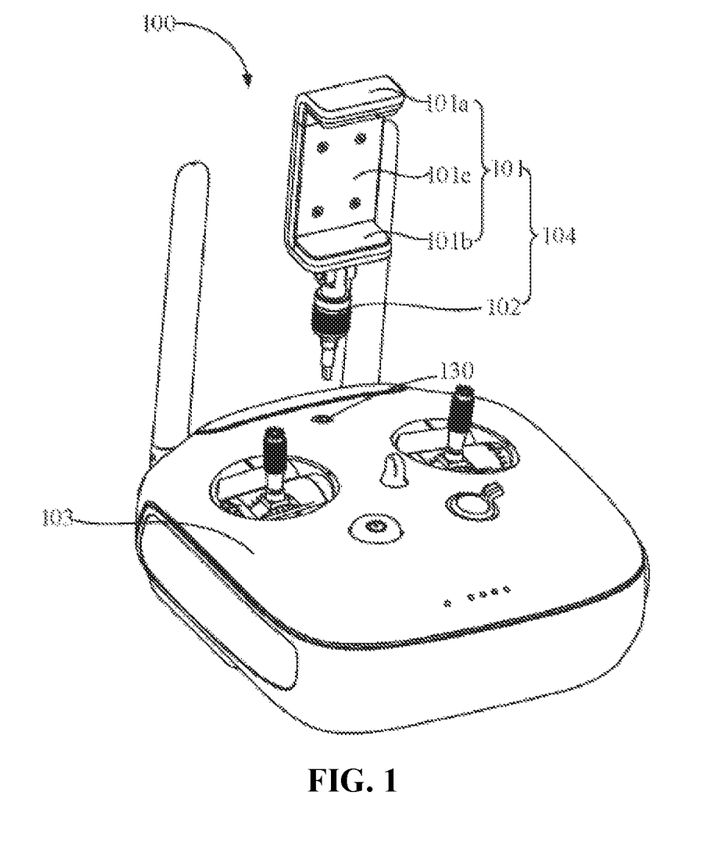
FIG. 1 is a perspective view of a remote controller, in accordance with exemplary embodiments of the present disclosure.
Figure 2:
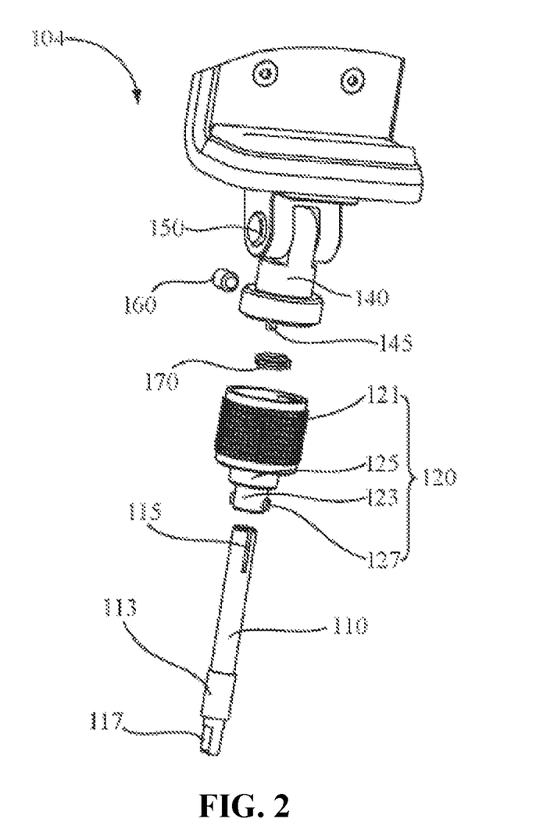
FIG. 2 is an exploded view of an exemplary support structure of the remote controller of FIG. 1, in accordance with exemplary embodiments of the present disclosure.
Figure 3:
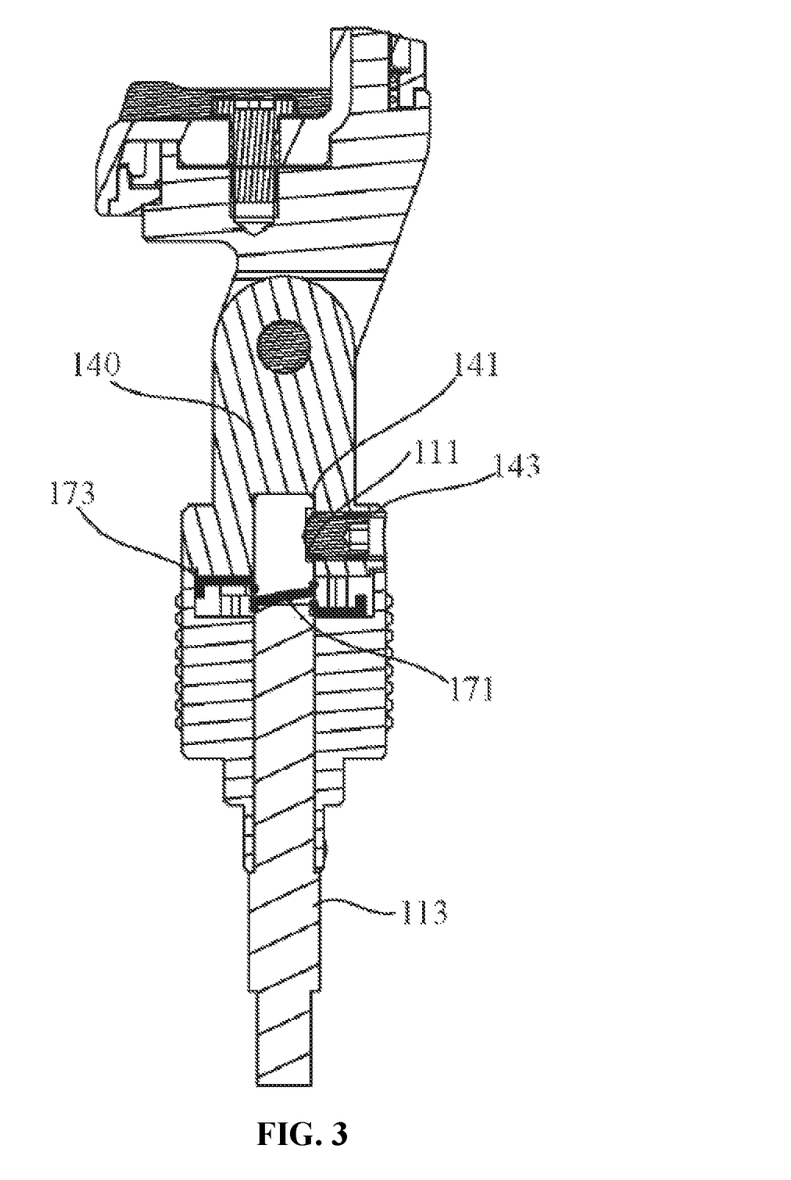
FIG. 3 is an axial cross-section view of the exemplary support structure of the remote controller of FIG. 1, in accordance with exemplary embodiments of the present disclosure.

FIGS. 1-3 illustrate a remote controller 100, in accordance with exemplary embodiments of the present disclosure. Remote controller 100 includes a clamping mechanism 101, a quick release connection structure 102, and a remote controller body 103. The clamping mechanism 101 is mounted on the remote controller body 103 through the quick release connection structure 102.

The quick release connection structure 102 includes a connecting shaft 110, a locking member 120, and a quick release base 130. The locking member 120 may be connected to the connecting shaft 110. The quick release base 130 is detachably connected to the locking member 120.

The connecting shaft 110 and the locking member 120 of the quick release connection structure 102 may form a support structure 104 together with the clamping mechanism 101, which may be configured to fix the portable electronic device onto the handheld device, such as the remote controller body 103.

The clamping mechanism 101 may be configured to clamp a portable electronic device, such as a tablet computer, a mobile phone, a navigator, etc.

The specific structure of the clamping mechanism 101 may be designed based on various demands. For example, in the embodiment illustrated in FIG. 1, the clamping mechanism 101 includes a first clamping portion 101a, a second clamping portion 101b, and a substrate 101c. The first clamping portion 101a and the second clamping portion 101b are disposed on two ends of the substrate 101c respectively and are opposite to and spaced apart from each other, jointly forming a clamping space.

At least one of the first clamping portion 101a and the second clamping portion 101b is slidably connected to the substrate 101c such that the first clamping portion 101a and/or the second clamping portion 101b are slidable towards or away from each other to change the size of the clamping space. For example, the first clamping portion 101a may include a guiding plate, and the substrate 101c may include a guiding slot extending along its longitudinal direction. The guiding plate is inserted into the guiding slot and is slidable along the guiding slot.

Additionally or alternatively, an elastic reset member is provided between the first clamping portion 101a and/or the second clamping portion 101b and the substrate 101c, to allow the first clamping portion 101a and/or the second clamping portion 101b to automatically reset, thereby providing a clamping force after their sliding relative to the substrate 101c.

The connecting shaft 110 may be movably connected or fixedly connected to the clamping mechanism 101. For example, the connecting shaft 110 is rotatably connected to the clamping mechanism 101.

In some aspects, the quick release connection structure 102 further includes a connecting member 140, and the connecting shaft 110 is fixedly connected to the connecting member 140. One end of the connecting member 140 is movably connected to the clamping mechanism 101. For example, the connecting member 140 is rotatably connected to the clamping mechanism 101 through a pivot shaft 150.

The connecting member 140 may be formed integrally with the connecting shaft 110, and may alternatively be detachably connected to a distal end of the connecting shaft 110, which is away from the quick release base 130. In some aspects, the quick release connection structure 102 further includes a stopper pin 160, and the connecting member 140 includes a shaft hole 141 and a stopper hole 143 in communication with the shaft hole 141. The connecting shaft 110 is inserted into the shaft hole 141, and the stopper pin 160 is inserted into the stopper hole 143 and abuts against the connecting shaft 110 to prevent the connecting shaft 110 from falling out of the shaft hole 141.

In some aspects, the stopper pin 160 may be a screw, the stopper hole 143 of the connecting member 140 may be a screw hole, and the connecting shaft 110 may have a recess 111 for the stopper pin 160 to abut against.

The locking member 120 is sleeved on the connecting shaft 110 and is rotatable around the connecting shaft 110. In some embodiments, the locking member 120 is non-slidably sleeved on the connecting shaft 110, that is, the locking member 120 cannot slide relative to the connecting shaft 110, but can rotate around the connecting shaft 110.

For example, the connecting shaft 110 includes a blocking portion 113. The two ends of the locking member 120 abut against the connecting member 140 and the blocking portion 113 respectively to prevent the locking member 120 from sliding along an axial direction of the connecting shaft 110.

In other embodiments, the locking member 120 may rotate relative to the connecting shaft 110, and may also slide along an axial direction of the connecting shaft 110.

The specific structure of the locking member 120 may be designed based on various demands. For example, the locking member 120 is a sleeve barrel structure and includes a main barrel body 121 and a positioning barrel 123. The main barrel body 121 is coaxially and fixedly connected to the positioning barrel 123. The connecting shaft 110 passes through the main barrel body 121 and the positioning barrel 123.

The locking member 120 may further include a connecting barrel 125. The outer diameter of the connecting barrel 125 is greater than the outer diameter of the positioning barrel 123 and is less than the outer diameter of the main barrel body 121, thereby forming step portions at the junctions between two ends of the connecting barrel 125 and the positioning barrel 123 and the main barrel body 121 respectively.

Figure 4:
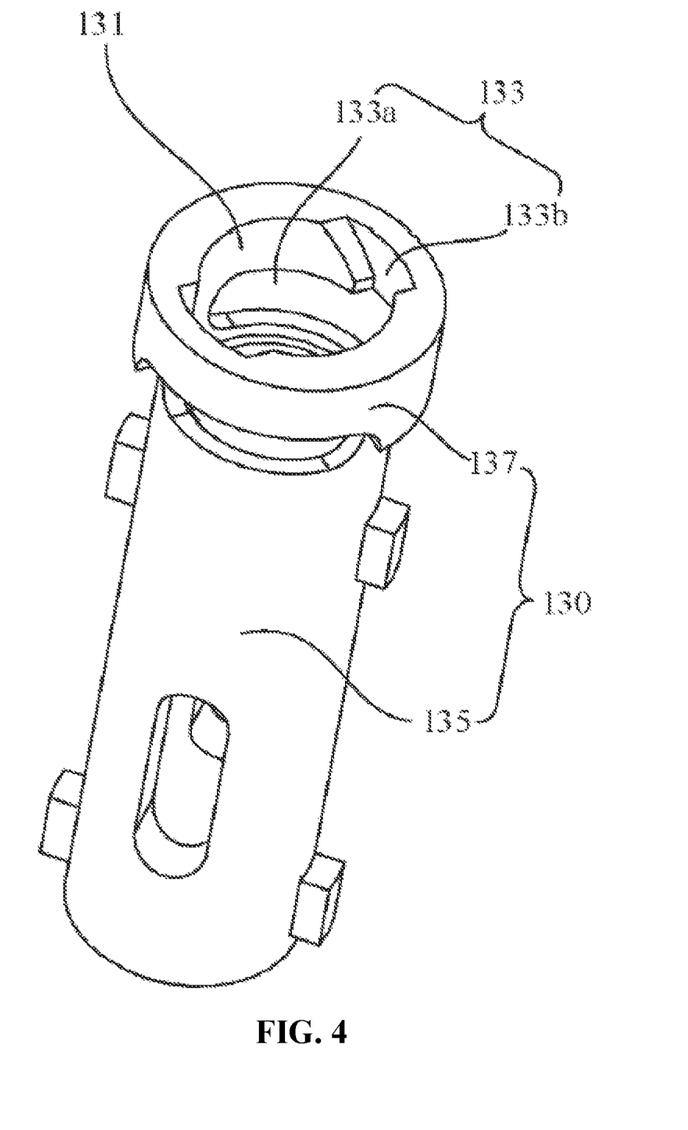
FIG. 4 is a perspective view of an exemplary quick release base of the remote controller of FIG. 1, in accordance with exemplary embodiments of the present disclosure.

The detachable connection between the locking member 120 and the quick release base 130 may be designed based on various demands. For example, as shown in FIG. 4, the quick release base 130 includes a positioning hole 131 for insertion of the connecting shaft 110 so as to facilitate positioning of the connecting shaft 110. The outer diameter of the positioning barrel 123 is approximately equal to the inner diameter of the positioning hole 131 to suitably insert or fit the positioning barrel 123 into the positioning hole 131. The step portion formed at the junction between the connecting barrel 125 and the positioning barrel 123 is blocked outside the positioning hole 131.

As shown in FIGS. 2 and 4, in order to attach the connecting shaft 110 into the positioning hole 131 of the quick release base 130, the positioning barrel 123 of the locking member 120 includes a lock catch 127, and the positioning hole 131 of the quick release base 130 includes a slot 133 that can engage with the lock catch 127.

The locking structure of the lock catch 127 and the slot 133 may also be designed based on various demands. For example, as illustrated in FIGS. 2 and 4, the lock catch 127 is disposed on an outer surface of the positioning barrel 123 of the locking member 120, and the slot 133 is disposed on an interior wall of the positioning hole 131 of the quick release base 130.

The shape of the slot 133 may be designed based on various demands. For example, as illustrated in FIG. 4, the slot 133 includes a guiding slot portion 133a and a locking notch 133b in communication with the guiding slot portion 133a. The lock catch 127 slides into the guiding slot portion 133a via the locking notch 133b and is engaged or interlocked with the guiding slot portion 133a, to prevent the connecting shaft 110 from falling out from the positioning hole 131.

For example, the guiding slot portion 133a extends along a circumferential direction of the positioning hole 131 of the quick release base 130, and the locking notch 133b extends from the guiding slot portion 133a towards an opening of the positioning hole 131 along an axial direction of the positioning hole 131 of the quick release base 130.

In other embodiments, the lock catch 127 is disposed on an inner surface of the positioning barrel 123 of the locking member 120, and the positioning hole 131 may have a limiting barrel (not shown). The connecting shaft 110 passes through the limiting barrel, and the slot 133 is disposed on an outer wall of the limiting barrel. The positioning barrel 123 of the locking member 120 may be sleeved on an outer wall of the limiting barrel of the positioning hole 131.

In such instances, the slot 133 includes a guiding slot portion 133a and a locking notch 133b in communication with the guiding slot portion 133a. The lock catch 127 slides into the guiding slot portion 133a via the locking notch 133b and is engaged or interlocked with the guiding slot portion 133a to prevent the connecting shaft 110 from falling out from the positioning hole 131.

For example, the guiding slot portion 133a extends along a circumferential direction of the limiting barrel of the positioning hole 131, and the locking notch 133b extends from the guiding slot portion 133a towards an opening of the limiting barrel along an axial direction of the limiting barrel.

The locking member 120 may automatically reset to its original position after rotating around the connecting shaft 110. For example, the quick release connection structure 102 includes a rotating reset member 170 that provides a rotational torque for the locking member 120.

For example, as illustrated in FIG. 2, the rotating reset member 170 is sleeved on the connecting shaft 110, and is connected to the locking member 120.

Figure 5:
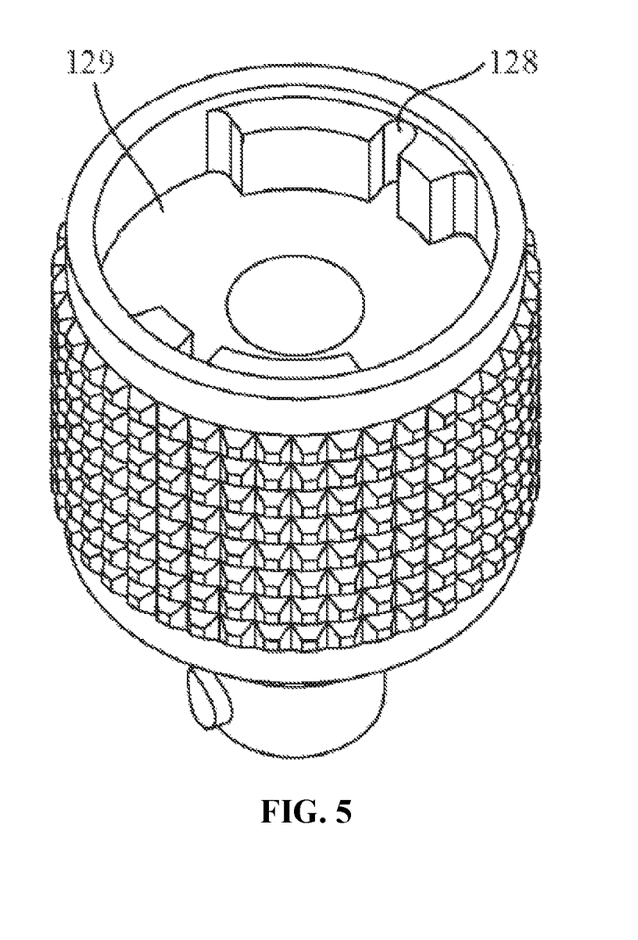
FIG. 5 is a perspective view of an exemplary locking member of the exemplary support structure of the remote controller of FIG. 1, in accordance with exemplary embodiments of the present disclosure.

The specific structure of the rotating reset member 170 may be designed based on various different demands. For example, the rotating reset member 170 may be a torsion spring, an extension spring, a compression spring, etc. In some embodiments, as shown in FIG. 3, the rotating reset member 170 is a torsion spring. The torsion spring includes a cross bar 171 located in the middle and spring legs 173 located at two ends of the cross bar 171 respectively. The two spring legs 173 of the torsion spring are connected to the locking member 120. For example, the locking member 120 includes two slots 128 (as shown in FIG. 5), and the two spring legs 173 of the torsion spring are fit into the two slots 133 respectively. The cross bar 171 of the torsion spring is fixedly connected to the connecting shaft 110. As shown in FIG. 2, one end of the connecting shaft 110 includes a positioning groove 115, which is close to the connecting member 140. The positioning groove 115 extends along an axial direction of the connecting shaft 110, and the cross bar 171 is fit within the positioning groove 115 of the connecting shaft 110. When the locking member 120 rotates relative to the connecting shaft 110, the two spring legs 173 of the torsion spring produce elastic deformation, thereby providing an elastic torque for the connecting shaft 110.

Figure 6:
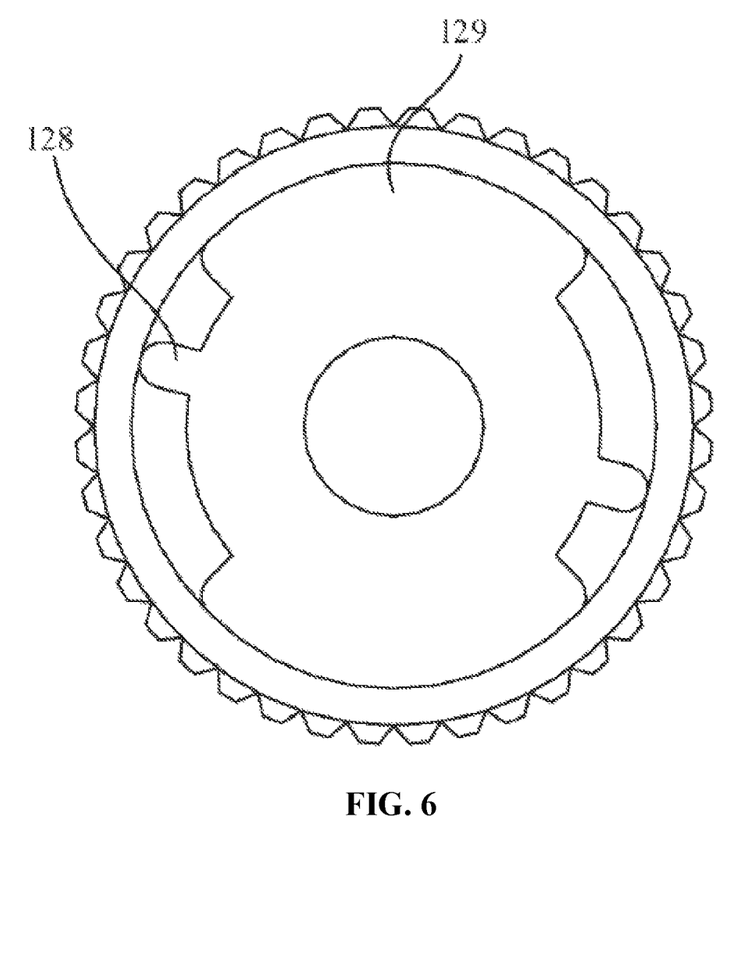
FIG. 6 is a top view of the exemplary locking member of the exemplary support structure of the remote controller of FIG. 1, in accordance with exemplary embodiments of the present disclosure.

As shown in FIG. 5 and FIG. 6, the locking member 120 includes a limiting part 129 for limiting a rotational angle of the locking member 120 relative to the connecting shaft 110.

As shown in FIG. 2, the connecting member 140 may include a mating part 145 for fitting with the limiting part 129 of the locking member 120 to prevent the locking member 120 from continuously rotating forward relative to the connecting shaft 110. For example, the limiting part 129 is a limiting groove disposed on the locking member 120, and the mating part 145 is a mating pillar disposed on the connecting member 140.

It should be noted that the mating part 145 is not limited to being disposed on the connecting member 140, and may alternatively be disposed on the connecting shaft 110.

To increase the strength of connection between the connecting shaft 110 and the quick release base 130, when the rotating reset member 170 is in a natural state, the lock catch 127 on the connecting shaft 110 is engaged with the slot 133 of the quick release base 130. When the lock catch 127 on the connecting shaft 110 is rotatably disengaged from the slot 133 of the quick release base 130, the rotating reset member 170 produces elastic deformation while the locking member 120 is rotated. Hence, when the connecting shaft 110 and the quick release base 130 need to be disengaged from each other, the elastic torque of the rotating reset member 170 needs to be overcome. Such design allows the lock catch 127 of the locking member 120 to be engaged with the slot 133 of the quick release base 130 until they are purposefully disengaged.

In some embodiments, as shown in FIG. 2, one end of the connecting shaft 110 includes a guiding portion 117, which engages or fits with the quick release base 130. The shape of the guiding portion 117 matches the shape of the bottom of the positioning hole 131 such that the connecting shaft 110 can be inserted into the positioning hole 131 at a preset angle.

The specific structure of the guiding portion 117 may be designed based on various demands. For example, as illustrated in FIG. 2, the guiding portion 117 is a flat portion at an end portion of the connecting shaft 110, and the shape of the bottom of the positioning hole 131 of the quick release base 130 is approximately the same as the shape of the flat portion. When the shape of the guiding portion 117 of the connecting shaft 110 matches the shape of the bottom of the positioning hole 131, the connecting shaft 110 can be completely inserted into the positioning hole 131.

The structure of the quick release base 130 may be designed based on various demands. For example, as illustrated in FIG. 4, the quick release base 130 has a barrel body structure, which includes a mounting barrel 135 and a limiting ring 137 at an opening end of the mounting barrel 135. The slot 133 is disposed on an inner wall of the limiting ring 137. The mounting barrel 135 and an inner cavity of the limiting ring 137 together form the positioning hole 131.

The quick release base 130 may be assembled together with the remote controller body 103. For example, as illustrated in FIG. 1, the quick release base 130 is embedded in a prefabricated hole in the remote controller body 103. In other embodiments, the quick release base 130 may be formed integrally with the remote controller body 103.

The locking member 120 may rotated to make the locking member 120 in a locked state of being engaged with the quick release base 130 and an unlocked state of being separated from the quick release base 130 selectively as needed. When the locking member 120 is in the locked state, the connecting shaft 110 is positioned in the positioning hole 131 of the quick release base 130, and is difficult to pull out. When the locking member 120 is in the unlocked state, the connecting shaft 110 may be pulled out from the positioning hole 131 of the quick release base 130 freely.

When the support structure 104 needs to be removed from the handheld device, such as the remote controller body 103, the locking member 120 is rotated along a preset direction, e.g., along the clockwise direction, until the lock catch 127 of the locking member 120 slides from the guiding slot portion 133a of the quick release base 130 to the locking notch 133b. Then, the locking member 120 is pulled along the axial direction of the connecting shaft 110 until the lock catch 127 of the locking member 120 is removed from the locking notch 133b of the quick release base 130. Finally, the connecting shaft 110 is pulled along the axial direction of the connecting shaft 110, and the connecting shaft 110 may then be completely removed from the positioning hole 131 of the quick release base 130.

When the support structure 104 needs to be mounted on the handheld device, such as the remote controller body 103, the guiding portion 117 of the connecting shaft 110 is inserted into the positioning hole 131 of the quick release base 130, and the connecting shaft 110 is rotated until the guiding portion 117 of the connecting shaft 110 engages or fits with the bottom of the positioning hole 131 of the quick release base 130. Then, the locking member 120 is rotated until the lock catch 127 of the locking member 120 engages or fits with the locking notch 133b of the slot 133 of the quick release base 130. Further, the connecting shaft 110 is pushed along the axial direction of the connecting shaft 110 until the lock catch 127 of the locking member 120 slides into the guiding slot portion 133a of the slot 133 of the quick release base 130. Finally, the locking member 120 is rotated along a direction opposite to the preset direction, e.g., along the counterclockwise direction, until the lock catch 127 of the locking member 120 slides into the bottom of the guiding slot portion 133a of the slot 133 of the quick release base 130, thereby fixedly connecting the locking member 120 to the quick release base 130.

Compared with conventional support structures, the support structure 104 described above at least has the following advantages:

(1) The support structure 104 described above is detachably fitted with the quick release base 130 through the connecting shaft 110 of the quick release connection structure 102, allowing for detachably mounting the clamping mechanism 101 on the handheld device, such as the remote controller body 103, and thereby allowing for the support structure 104 described above to be more conveniently mounted on the handheld device, such as the remote controller body 103, or removed from the handheld device, such as the remote controller body 103.

(2) The connecting shaft 110 of the quick release connection structure 102 described above includes a lock catch 127, the quick release base 130 includes a slot 133 that can engage with the lock catch 127. Because such connection between the lock catch 27 and the quick release base 130 allows the lock catch 127 to fit with the slot 133 with stronger structural strength, the quick release connection structure 102 described above has higher strength of connection to the handheld device.

(3) The slot 133 of the quick release base 130 of the quick release connection structure 102 described above includes a guiding slot portion 133a and a locking notch 133b in communication with the guiding slot portion 133a. The lock catch 127 of the locking member 120 slides into the guiding slot portion 133a from the locking notch 133b of the slot 133, so that the connecting shaft 110 and the lock catch 127 do not easily disengage from the guiding slot portion 133a, which increases the strength of connection of the quick release connection structure 102 described above.

(4) The connecting shaft 110 of the quick release connection structure 102 described above includes a rotating reset member 170 to allow the connecting shaft 110 to automatically reset to its original position after rotating. This allows the lock catch 127 of the locking member 120 to remain engaged with the slot 133 of the quick release base 130 in a normal state, making the use of the quick release connection structure 102 described above relatively secure.

Figure 7:
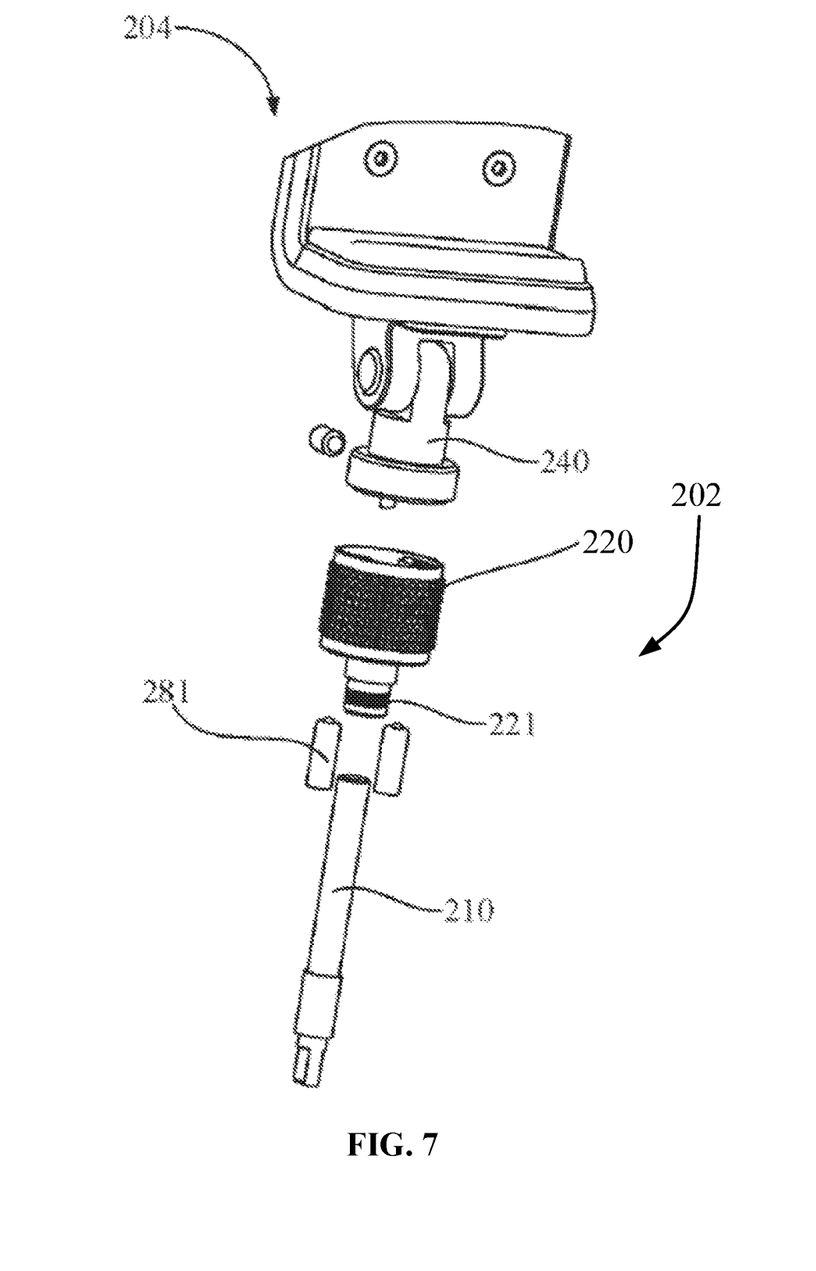
FIG. 7 is an exploded view of an exemplary support structure of another exemplary remote controller, in accordance with exemplary embodiments of the present disclosure.
Figure 8:
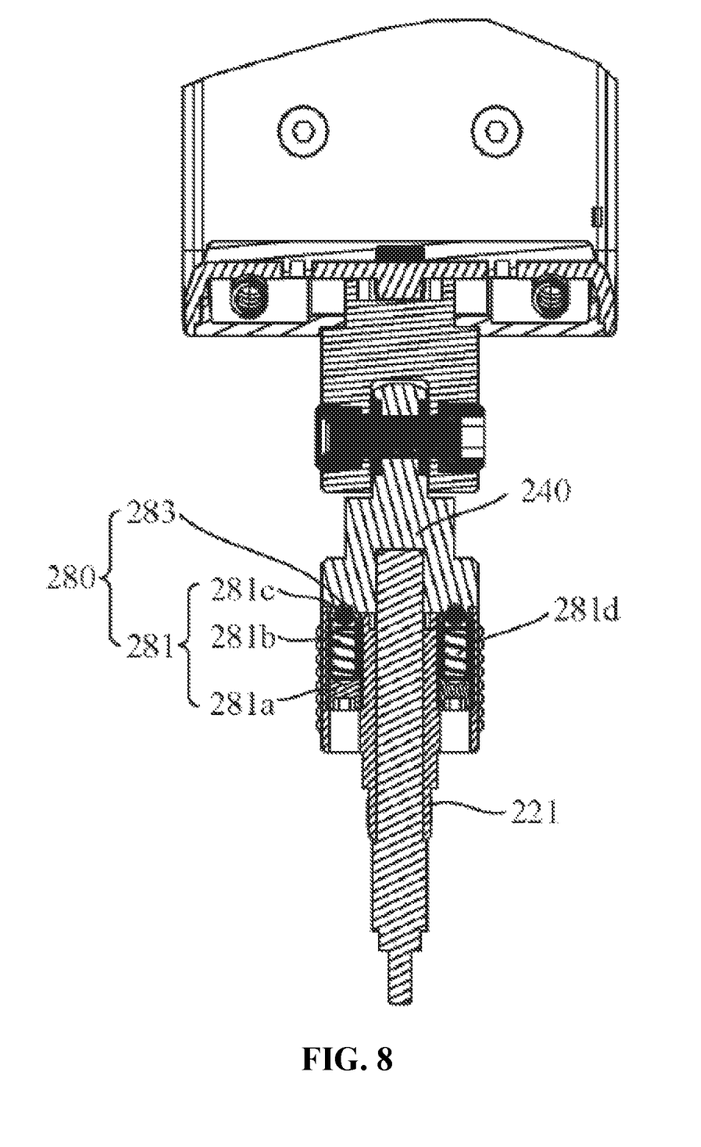
FIG. 8 is an axial cross-section of an exemplary support structure of the remote controller of FIG. 7, in accordance with exemplary embodiments of the present disclosure.

FIG. 7 is an exploded view of another exemplary support structure 204. FIG. 8 is an axial cross-section of the support structure 204 of FIG. 7. As shown in FIGS. 7 and 8, a detachable connection structure 202 of a remote controller is approximately the same as the quick release connection structure 102 of the remote controller 100 described above. Their difference lies in that: the detachable connection structure 202 includes a locking member 220, which corresponding to the locking member 120 of the quick release connection structure 102, that fits with the quick release base by threaded fit.

The manner in which the locking member 220 fits with the quick release base by threaded fit may be designed based on various demands. For example, as illustrated in FIG. 7, the locking member 220 includes external threads 221, and the positioning hole 131 is a threaded hole that may engage with the external threads 221 by screwing the locking member 220 to the positioning hole 131.

In other embodiments, the locking member 220 includes a threaded hole, and the positioning hole 131 of the quick release base 130 includes a limiting barrel. The connecting shaft 210 passes through the limiting barrel. An outer wall of the limiting barrel includes external threads that engage with the threaded hole of the locking member 220 by screw.

The locking member 220 may automatically remain at its current position after rotating around the connecting shaft 210. For example, as illustrated in FIG. 8, the detachable connection structure 202 includes a limiting mechanism 280 for limiting the locking member 220.

The specific structure of the limiting mechanism 280 may be designed based on various demands. For example, as shown in FIG. 8, the limiting mechanism 280 includes a plunger assembly 281 on the locking member 220, and a plurality of engaging parts 283, e.g., slots, on the connecting member 240. The locking member 220 includes a mounting hole for receiving the plunger assembly 281.

The plunger assembly 281 includes a plunger 281a, a sliding reset member 281b, and one or more elastic beads 281c. The plunger 281a includes an accommodating hole 281d extending along its axial direction, and the sliding reset member 281b and the elastic beads 281c are received in the accommodating hole 281d of the plunger 281a. The sliding reset member 281b abuts against the elastic beads 281c, providing elastic restoring force to the elastic beads 281c. A elastic bead 281c may selectively fit in one of the plurality of engaging parts 283, allowing the locking member 220 to stay at the current rotation position corresponding to the position of the engaging parts 283. The engaging part 283 may be a slot, a fitting protrusion, etc., that can engage with the elastic bead 281c.

The plurality of engaging parts 283 correspond to a plurality of gears respectively. For example, as shown in FIG. 8, there are two engaging parts 283, which correspond to an unlocking gear where the locking member 220 is in an unlocked state and a locking gear where the locking member 220 is in a locked state respectively.

In other embodiments, the limiting mechanism 280 includes an elastic snapping strip (not shown) disposed on the locking member 220 and continuous tooth grooves disposed on the connecting shaft 210. The continuous tooth grooves are disposed around the peripheral edge of the connecting shaft 210. An elastic snapping strip may selectively engage with one tooth groove in the continuous tooth grooves to limit the locking member 220.

The locking member 220 of the detachable connection structure 202 described as above includes a limiting mechanism 280 to allow the connecting shaft 210 to stay at a preset position after rotating, so as to make it relatively convenient to operate the lock catch of the locking member 220.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A remote controller comprising:
   a handheld device including a quick release base; and
   a support structure detachably coupled to the handheld device, the support structure including:
   a clamping mechanism;
   a connecting shaft coupled to the clamping mechanism; and
   a locking member sleeved on the connecting shaft and rotatable around the connecting shaft,
   wherein:
   the locking member is configured to be rotatably switched between a locked state of being engaged with the quick release base and an unlocked state of being separated from the quick release base:
   the locking member comprises a lock catch; and
   the quick release base comprises a slot that engages with the lock catch.

2. The remote controller of claim 1, wherein the quick release base comprises a positioning hole for insertion of the connecting shaft.

3. The remote controller of claim 1, wherein the lock catch is disposed on an outer surface of the locking member, and the slot is disposed on an interior wall of a positioning hole of the quick release base configured for insertion of the connecting shaft.

4. The remote controller of claim 1, wherein:
   the lock catch is disposed on an inner surface of the locking member.

5. The remote controller of claim 1, wherein
   the slot comprises a guiding slot portion and a locking notch in communication with the guiding slot portion, and
   the lock catch is configured to slide into the guiding slot portion from the locking notch to engage with the guiding slot portion.

6. The remote controller according to claim 2, wherein one end of the connecting shaft that is inserted in the quick release base comprises a guiding portion, and a shape of the guiding portion matches a shape of a bottom of the positioning hole.

7. The remote controller of claim 1, further comprising:
   a rotating reset member that provides a rotational torque for the locking member to reset to an original position of the locking member after rotating around the connecting shaft.

8. The remote controller of claim 7, wherein the rotating reset member is sleeved on the connecting shaft, and is connected to the locking member.

9. The remote controller of claim 1, wherein the locking member comprises a limiting part for limiting a rotational angle of the locking member relative to the connecting shaft.

10. The remote controller of claim 1, further comprising:
    a connecting member detachably coupled to one end of the connecting shaft that is away from the quick release base,
    wherein:
    the connecting shaft comprises a blocking portion, and two ends of the locking member abut against the connecting member and the blocking portion, respectively.

11. The remote controller of claim 10, further comprising:
    a stopper pin,
    wherein:
    the connecting member comprises a shaft hole and a stopper hole in communication with the shaft hole, the connecting shaft is inserted in the shaft hole, and the stopper pin is inserted in the stopper hole and abuts against the connecting shaft.

* * * * *